Jan. 13, 1959     H. C. PAULSEN     2,868,160
MACHINES FOR APPLYING HEATED THERMOPLASTIC ADHESIVES
Filed May 31, 1955     3 Sheets-Sheet 1
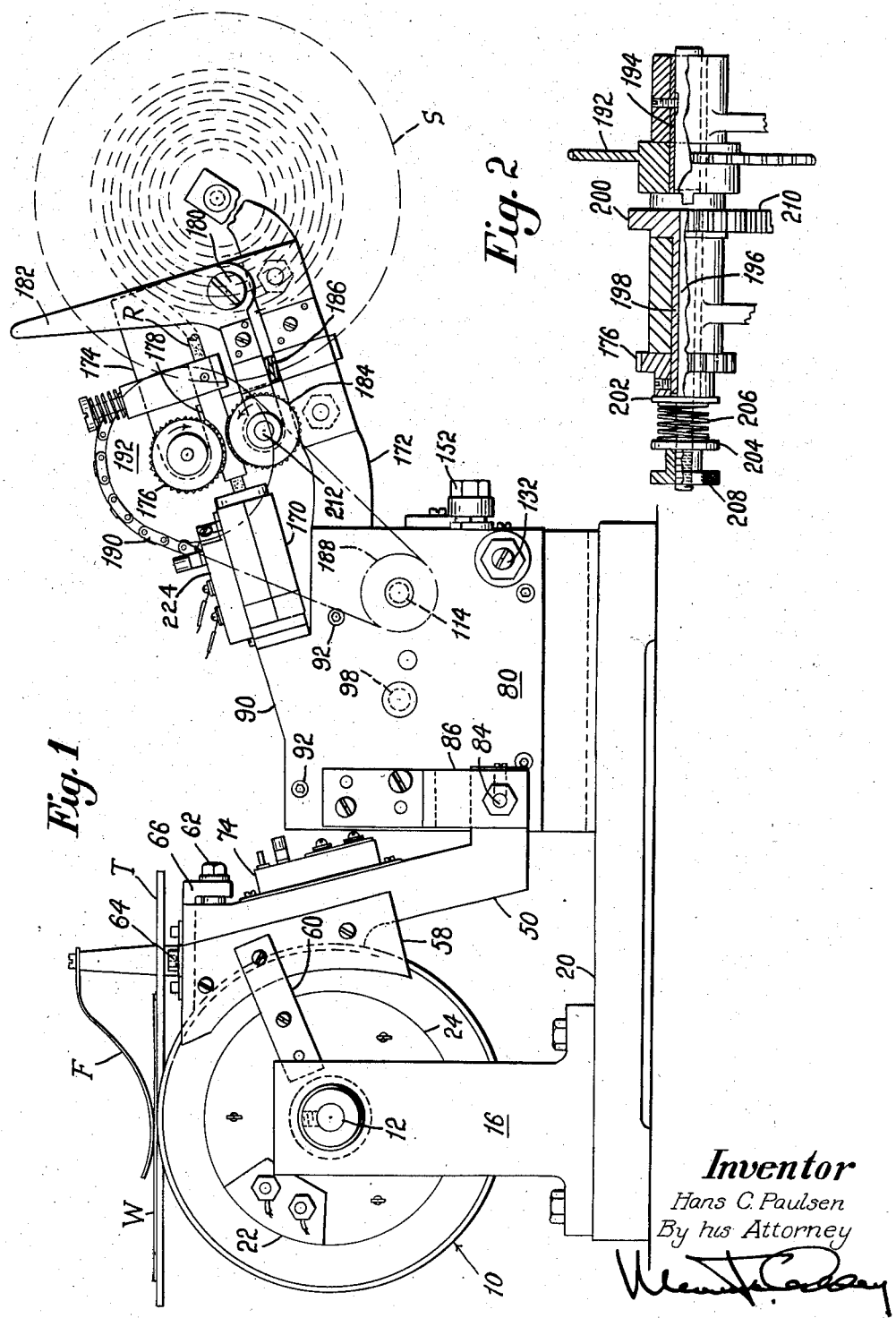
Inventor
Hans C. Paulsen
By his Attorney Jan. 13, 1959     H. C. PAULSEN     2,868,160
MACHINES FOR APPLYING HEATED THERMOPLASTIC ADHESIVES
Filed May 31, 1955     3 Sheets-Sheet 2

Inventor
Hans C. Paulsen
By his Attorney

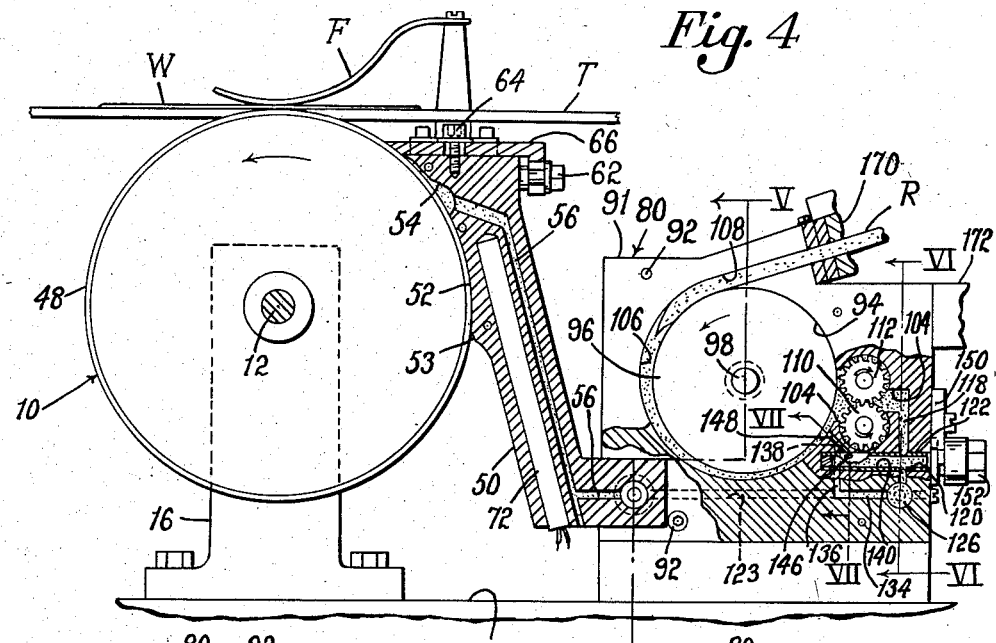
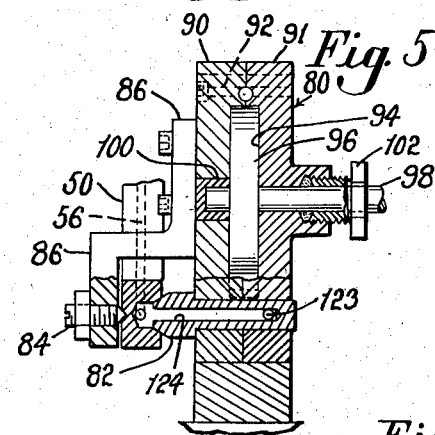
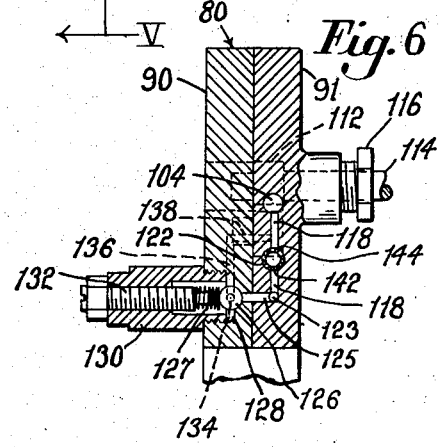
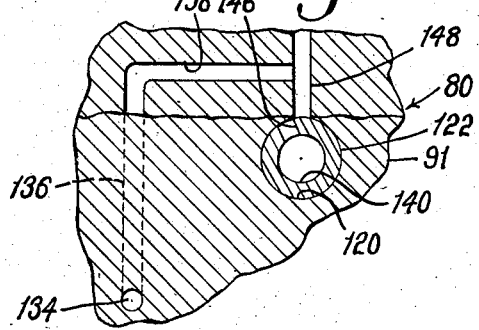

United States Patent Office 2,868,160
Patented Jan. 13, 1959

2,868,160

MACHINES FOR APPLYING HEATED THERMOPLASTIC ADHESIVES

Hans C. Paulsen, Medford, Mass., assignor to United Shoe Machinery Corporation, Flemington, N. J., a corporation of New Jersey Application May 31, 1955, Serial No. 512,146

10 Claims. (Cl. 118—202)

This invention relates to machines for applying heated thermoplastic adhesives and is herein illustrated as embodied in a machine for applying a band or strip of adhesive to a blank, or similar work piece, as the latter is fed along. It will be understood, however, that in various aspects the invention is not limited to use in a machine of this particular type or to the exact mechanical arrangement herein disclosed.

In prior machines of the mentioned type, a common arrangement consists of a reservoir or tank for melting and supplying the thermoplastic adhesive and a driven applying roll substantially submerged in the molten adhesive with an upper portion of the roll exposed for applying adhesive to a work piece as the latter is fed along and held in contact with the exposed portion of the roll. Because of difficulties inherent in the use of a heated reservoir or tank, it has recently been proposed to provide the thermoplastic adhesive in the form of an elongated rod, or strip, which is progressively melted as it is used, and an arrangement of this sort is disclosed and claimed in United States Letters Patent No. 2,726,629, granted December 13, 1955, in my name. While the machine shown in that patent has proved to be quite satisfactory for the purpose disclosed, it does have certain limitations which tend to restrict somewhat its field of usefulness.

It is, therefore, a principal object of the present invention to provide a novel and improved machine for applying heated thermoplastic adhesive which, while embodying all of the advantages of the prior arrangement, has a considerably wider range of utility. With this object in view, the herein illustrated machine, which, in common with the prior machine, has a heated casing provided with a chamber for receiving and melting the leading end of a solid rod of thermoplastic adhesive, which chamber contains a rotatable disk for heating and feeding the adhesive from an inlet opening of the chamber to an outlet opening thereof, is provided with a separately driven and heated roll for applying the molten adhesive to a work piece, together with a housing which partially surrounds the applying roll and which has a passage for conducting the molten adhesive to the periphery of the roll, and means for connecting the outlet opening of the chamber in the heated casing to the passage in the housing which surrounds the applying roll. With this arrangement, it will be apparent that the size as well as the speed of rotation of the driven applying roll may be varied as desired to suit different operating conditions independently of the size and speed of rotation of the disk of the adhesive melting and supplying mechanism. Preferably, and in the herein illustrated machine, a pump is utilized to deliver molten adhesive from the outlet opening of the heating and melting chamber to the passage in the housing which surrounds the applying roll, and a manually adjustable by-pass valve is provided for controlling the output of this pump in order to vary the quantity of molten adhesive conducted to the periphery of the applying roll, the pressure of the molten adhesive, as it is delivered to the applicator roll, being regulated by a spring loaded relief valve. In addition, there is associated with the housing an adjustable doctor blade for nicely regulating the thickness of the molten adhesive on the periphery of the applying roll. Thus, the action of the applying roll may be controlled to suit different working conditions independently of the operation of the adhesive melting and supplying mechanism.

The above and other objects and features of the invention will appear in the following detailed description of the preferred embodiment thereof which is illustrated in the accompanying drawings and will be pointed out in the claims.

In the drawings,

Fig. 1 is a view in side elevation showing a machine embodying the features of this invention;

Fig. 2 is a detail view of a portion of the machine shown in Fig. 1 with certain parts in vertical section;

Fig. 4 is a view in side elevation of a portion of the machine shown in Fig. 1, with certain parts in vertical section;

Fig. 5 is a view of a part of the machine shown in section substantially on line V—V of Fig. 4 and looking in the direction of the arrows, this view being at an enlarged scale;

Fig. 6 is a view in section of a part of the machine substantially on line VI—VI of Fig. 4 and looking in the direction of the arrows; and Fig. 7 is a view in section of a part of the machine substantially on line VII—VII of Fig. 4 and looking in the direction of the arrows.

Figure 3:
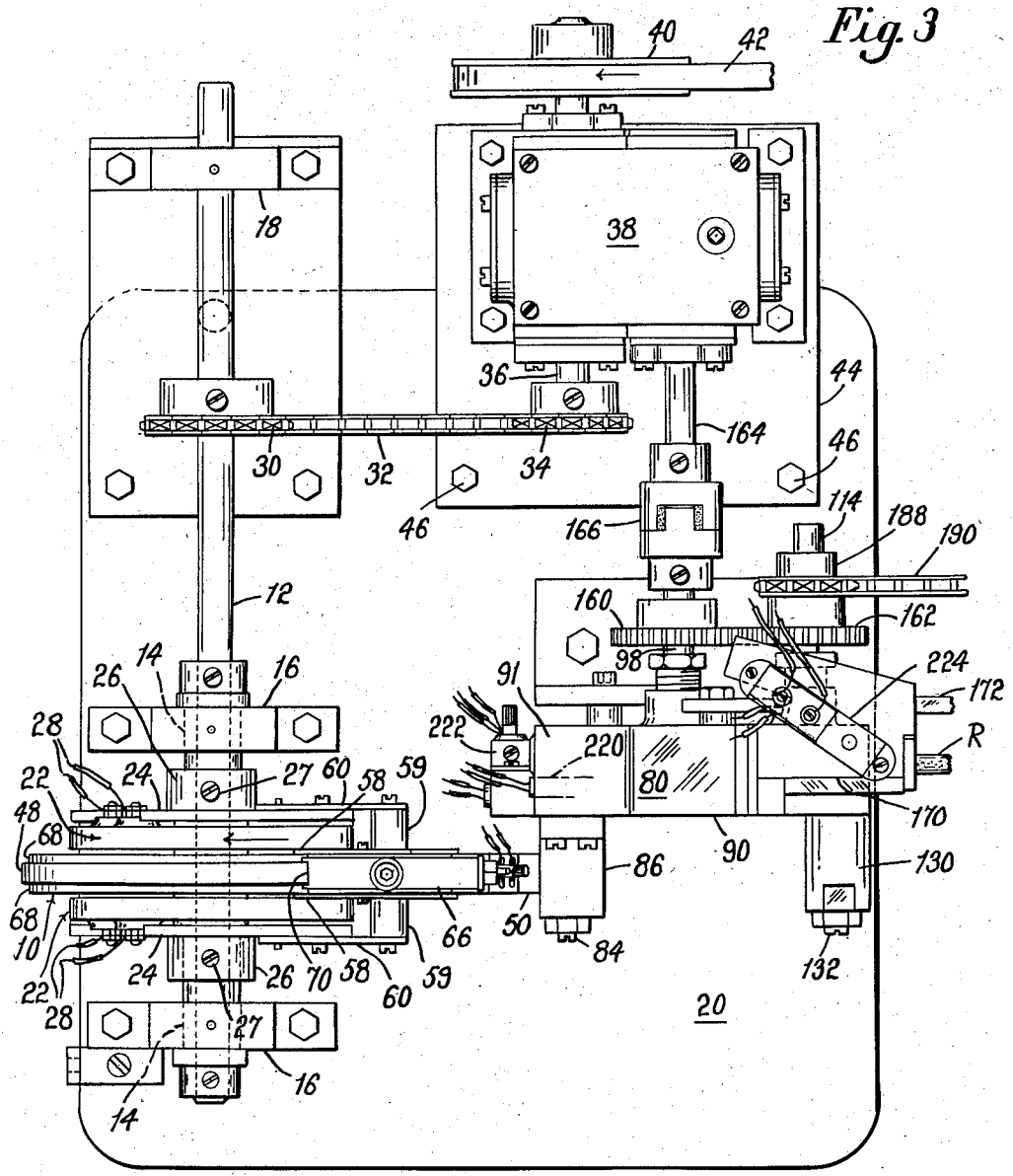
Fig. 3 is a plan view of the machine shown in Fig. 1.

Referring to these drawings, and particularly to Fig. 1, the machine therein illustrated is intended for use in applying a band of heated thermoplastic adhesive to a work piece W by means of an applicator roll, or disk 10, as the work piece is fed past the applicator roll, manually or otherwise, while supported on a suitable table T and held yieldingly against the roll 10, for example, by means of a spring finger F. The applicator roll is secured to a shaft 12 which is journaled in two bearing bushings 14, 14 mounted in two brackets 16, 16 and in a third bracket 18, Fig. 3, all of these brackets being supported on a base plate 20. Located closely adjacent to the opposite sides of the applicator roll 10 are two electrical heating units 22, 22 each supported on a disk 24 having a hub member 26 which is secured to a bushing 14 by means of a setscrew 27. These heating units are connected to a suitable source of electrical energy, not shown, by means of leads 28, 28. Secured to the shaft 12 is a sprocket 30 which is connected, by means of a chain 32 to a second sprocket 34 mounted on one end of the input shaft 36 of a speed reducing gear, indicated generally by the reference character 38. On the other end of the shaft 36 there is secured a pulley 40 which is connected to a drive motor, not shown, by means of a belt 42. This speed reducing gear has a base portion 44 which is mounted on the base plate 20 by means of screws 46, 46.

Associated with the applicator roll 10 is a housing 50 through which heated thermoplastic adhesive is supplied to the peripheral surface 48 of the applicator roll. This housing is provided with an arcuate surface 52, beveled off at one end as indicated at 53, Fig. 4, which is complemental to the periphery of the roll 10 and in which there is located a discharge orifice 54, Fig. 4. This orifice is in communication with a passageway 56 formed in the housing and through which heated thermoplastic adhesive is forced in a manner which will presently appear. Secured to the upper end of the housing 50 are two side plates 58, 58 which embrace the opposite sides of the applicator roll 10, see Fig. 3, and extending from supporting blocks 59, 59 on these side plates to the disks 24 are two supporting arms 60, 60. Adjustably mounted on the upper end of the housing 50, by means of an adjusting screw 62 and a clamp screw 64 is a doctor blade 66. As shown in Fig. 3, the periphery of the roll 10 is cut back to provide two shoulders 68, 68, and the doctor blade 66 has a centrally located recess 70 so as to fit over the peripheral surface 48 of the roll. Heat is supplied to the housing 50 by an electrical heating unit 72 which is connected to the source of electrical energy referred to above and controlled by a thermostat 74, Fig. 1.

At its lower end, the housing 50 is supported on a casing 80 by means of a conical stud 82, associated with the casing, and a bearing screw 84 which is threaded through an L-shaped bracket 86, secured to the casing, see Fig. 5. The casing 80 is formed of two plates 90, 91 which are secured together by screws 92, 92, Fig. 1, and which are shaped to provide a generally circular recess 94, Fig. 4. Located within this recess is a heating and feeding disk 96 which is formed integrally on a shaft 98, this shaft being journaled at one end in a bushing 100 and having its other end extending outwardly of the casing through a stuffing box 102, Fig. 5. As will be apparent from an inspection of Fig. 4, the recess 94 is shaped to fit snugly around a portion of the disk 96 adjacent to a radial passage 104 which forms an outlet from a space 106 around the periphery of the disk which is of an increasing radial thickness extending from said outlet to a passageway 108 which forms an inlet to the space 106. The outlet 104 extends outwardly away from the recess 94 and is shaped to receive a gear pump comprising two meshing gears 110, 112, which are suitably journaled in the casing 80, one of these gears being formed integrally with a shaft 114 which extends outwardly of the casing through a stuffing box 116, Fig. 6.

The outlet 104, beyond the gear pump, is connected to a downwardly extending passage 118 which passes through a bore 120 in the casing in which there is rotatably mounted a by-pass valve 122, Figs. 4 and 7. Below this bore, the passage 118 is connected to a forwardly extending passage 123, the left end of which (Fig. 4) in turn is connected to a passage 124 formed in the conical stud 82 and thereby is in communication with the aforementioned passage 56 of the housing 50, Fig. 5. The lower end of passage 118 also joins a laterally extending passage 125 against the outer end of which, in plate 90, a ball valve 126 is seated by means of a spring 127, Fig. 6. Threaded into a recess 128, formed in the plate 90, is a valve housing 130 in which the spring 127 is received, this spring bearing at one end on the ball valve 126 and at its other end on an adjusting screw 132. The recess 128 is in communication with a forwardly extending passage 134, Fig. 4, which in turn is connected to a vertically extending passage 136, formed in the plate 90 and in communication with a laterally extending passage 138, Figs. 6 and 7.

The by-pass valve 122 has a central bore 140, Fig. 4, and adjacent to the passage 118 is formed with two diametrically located lower and upper openings 142, 144, Fig. 6. The lower opening 142, which is on the lower side of the by-pass valve, is of a circumferential width substantially equal to the diameter of the passage 118, while the upper opening 144, which is on the upper side of the by-pass valve, is substantially three times as wide as the passage 118. This by-pass valve is also provided with a third opening 146 which is in the same plane, see Fig. 7, as the lower end of a passage 148 formed in the casing 80 and leading into the recess 94 in the vicinity of the outlet 104, Fig. 4. The aforementioned passage 138 opens into the passage 148, as shown in Fig. 7. The by-pass valve 122 is held in place by means of a keeper plate 150 and has a head 152 by means of which it may be rotated from the position in which it is shown in Figs. 6 and 7, in a clockwise direction as viewed in Fig. 7, to cause the flow of molten adhesive through the lower opening 142 and thence through the housing 50 to be gradually shut off while the flow through the opening 146 into the passage 148, and back to the outlet 104, is gradually established and increased, the upper opening 144 being wide enough to maintain a flow of the molten adhesive into the bore 140 during such rotation of the by-pass valve 122.

Secured to the disk shaft 98 is a gear 160 which is in mesh with a second gear 162 fast on the pump shaft 114, Fig. 3. The shaft 98 is also connected to the output shaft 164 of the speed reducing gear 38 by means of a coupling 166. The action of the speed reducing gear 38 is such that the output shaft 164 is driven at a speed approximately one-tenth of that of the input shaft 36. Therefore, when the drive motor, not shown, is running, the applicator roll 10 will be rotated at a speed approximately ten times that of the heating and feeding disk 96.

Mounted on the casing 80 is a guide bushing 170 (Fig. 1) through which the leading end of a length of adhesive R in rod form may be introduced into the portion 106 of the recess 94. Secured to one side of the casing 80 is an angularly shaped bar 172 on the outer end of which there is rotatably mounted a spool S on which a supply of the rod adhesive is stored, Fig. 1. Fastened to this bar is a supporting plate 174 on which there is mounted an upper feed roll 176 and a guide bushing 178. Pivoted on this plate on a stud 180 is an L-shaped lever 182 one arm of which carries a pressure roll 184 which, under the action of a compression spring 186, is adapted to press the rod of adhesive R against the feed roll 176.

This feed roll is driven through a friction clutch from a sprocket 188 on the shaft 114, Fig. 2, by means including a chain 190 and another sprocket 192, Figs. 1 and 2. The sprocket 192 is journaled on a sleeve 194 and is drivingly connected to a shaft 196 which passes through a hollow elongated hub 198 formed on a gear 200, Fig. 2, to which the feed roll 176 is fastened. Bearing against the hub of the feed roll 176 is a friction washer 202 which is splined on the shaft 196. Threaded onto one end of this shaft is a nut 204 and interposed between this nut and the washer 202 is a compression spring 206, a locknut 208 being provided for holding the nut 204 in adjusted position. The aforementioned gear 200 is in mesh with another gear 210 which is secured to a shaft 212 on which the pressure roll 184 is mounted. As will be apparent, with the arrangement just described, each of the rolls 176 and 184 is frictionally driven through the action of the washer 202 on the hub of the roll 176.

The casing 80 is heated by means of several electrical heating units, one of which is shown in Fig. 3 of the drawings and identified by the reference character 220, these heating units being connected to the aforementioned source of electrical energy, not shown, and the temperature of different portions of the casing is regulated by means of suitable thermostats indicated by the reference characters 222 and 224.

The operation of the machine will now be described. With the motor, not shown, running, the disk 96 and applicator roll 10 will be rotated in the directions indicated by the arrows in Fig. 4, the latter turning at a speed approximately ten times that of the former. The leading end of the rod of adhesive R will be pushed through the inlet 104 into the space 106 which surrounds the disk 96 and, as the disk rotates, the adhesive will be progressively melted and fed along, partly by the action of the disk and partly by the action of the frictionally driven rolls 176, 184 toward the outlet 104. Molten adhesive in this outlet will be forced into the passage 118 by the action of the gear pump 110, 112 and thence, through the by-pass valve 122, and the passages 123, 124 and 56, to the discharge orifice 54 of the housing 50 from which the molten adhesive will be picked up by the peripheral surface 48 of the applicator roll 10. Thus as the work piece W is fed past and held in contact with the roll 10 a band of molten adhesive will be applied thereto.

The thickness of the layer of adhesive on the peripheral surface of the roll 10 may be varied to suit different operating conditions, e. g., speed of movement of the work piece and/or the thickness of the band of adhesive it is desired to apply thereto, by suitable adjustment ten of the doctor blade 66. Also, the rate at which molten adhesive is supplied to the discharge orifice 54 may be very accurately controlled by means of the by-pass valve 122 while the pressure of the molten adhesive, as it is supplied to the roll, is automatically regulated by the action of spring loaded ball valve 126. In this manner, molten adhesive may be supplied to the peripheral surface of the applicator roll at substantially the same rate as it is applied to the work piece. During all such variations in the rate of feed of the adhesive to the discharge orifice 54, effected by means of the by-pass valve 122, the rate of feed of the rod of adhesive R into the space 106 will be automatically regulated by the action of the frictionally driven feed rolls 176, 184. In this connection, it is noted that molten adhesive diverted from the passageway 118 by the by-pass valve 122, and/or by the ball valve 126, is fed back into the space 106. Also, when this space is filled by the entering solid end of the rod of adhesive R and molten adhesive, the friction clutch through which the feed rolls 176, 184 are driven will slip and the feeding of the rod of adhesive will cease.

With the arrangement described above, it is possible to make the applicator roll of any suitable diameter and to drive it at any desired speed, independently of the diameter and/or speed of rotation of the heating disk 96 which will be so selected as to assure an adequate supply of molten adhesive at the outlet 104 at all times. As herein illustrated, the applicator roll is approximately twice the diameter of the disk and is driven substantially ten times as fast. However, any other relationship of size and speed of these two elements may be selected as conditions require. In fact, it is unnecessary, in so far as the principle of this invention is concerned, that the applicator roll and heating disk be driven from a common power source, as shown, and separate drive means for each of these elements may be used.

Having thus described my invention, what I claim as new and desire to secure by Letters Patent of the United States is:

1. In a machine for applying heated thermoplastic adhesive to work pieces, a driven applying roll, a housing associated with and partially surrounding the roll and provided with a passage for conducting adhesive to the periphery of the roll, a heated casing provided with an elongated passageway for receiving and melting the leading end of a solid rod of adhesive and having an inlet and an outlet, means for feeding the leading end of a solid rod of adhesive into the inlet of said passageway, and means connecting said outlet with the passage in said housing.

2. In a machine for applying heated thermoplastic adhesive to work pieces, a driven applying roll, a housing associated with and partially surrounding the roll and provided with a passage for conducting adhesive to the periphery of the roll, a heated casing provided with a chamber for receiving and melting the leading end of a solid rod of adhesive and having an inlet and an outlet, a rotatable member, cooperating with said chamber to form a passageway within said casing extending from said inlet to said outlet, for melting the solid rod and for feeding adhesive along said passageway from the inlet to the outlet of said heated casing, and means connecting said outlet with the passage in said housing.

3. In a machine for applying heated thermoplastic adhesive to work pieces, a driven applying roll, a housing associated with and partially surrounding the roll and provided with a passage for conducting adhesive to the periphery of the roll, a heated casing provided with an elongated passageway for receiving and melting the leading end of a solid rod of adhesive and having an inlet and an outlet, means for feeding the leading end of a solid rod of adhesive into the inlet of said passageway, means connecting said outlet with the passage in said housing, and a pump for delivering molten adhesive from the outlet in said heated casing to the passage in said housing.

4. In a machine for applying heated thermoplastic adhesive to work pieces, a driven applying roll, a housing associated with and partially surrounding the roll and provided with a passage for conducting adhesive to the periphery of the roll, a heated casing provided with an elongated passageway for receiving and melting the leading end of a solid rod of adhesive and having an inlet and an outlet, means for feeding the leading end of a solid rod of adhesive into the inlet of said passageway, means connecting said outlet with the passage in said housing, a pump for delivering molten adhesive from the outlet in said heated casing to the passage in said housing, and means for controlling the output of said pump to vary the quantity of molten adhesive conducted to the periphery of the applying roll.

5. In a machine for applying heated thermoplastic adhesive to work pieces, a driven applying roll, a housing associated with and partially surrounding the roll and provided with a passage for conducting adhesive to the periphery of the roll, a heated casing provided with a chamber for receiving and melting the leading end of a solid rod of adhesive and having an inlet and an outlet, a rotatable member, cooperating with said chamber to form a passageway within the casing extending from said inlet to said outlet, for melting the solid rod and for feeding adhesive along said passageway from the inlet to the outlet of said heated casing, means connecting said outlet with the passage in said housing, and a pump for delivering molten adhesive from the outlet in said heated casing to the passage in said housing.

6. In a machine for applying heated thermoplastic adhesive to work pieces, a driven applying roll, a housing associated with and partially surrounding the roll and provided with a passage for conducting adhesive to the periphery of the roll, a heated casing provided with a chamber for receiving and melting the leading end of a solid rod of adhesive and having an inlet and an outlet, a rotatable member, cooperating with said chamber to form a passageway within the casing extending from said inlet to said outlet, for melting the solid rod and for feeding adhesive along said passageway from the inlet to the outlet of said casing, means connecting said outlet with the passage in said housing, a pump for delivering molten adhesive from the outlet in said heated casing to the passage in said housing, and means for controlling the output of said pump to vary the quantity of molten adhesive conducted to the periphery of the applying roll.

7. In a machine for applying heated thermoplastic adhesive to work pieces, a driven applying roll, a housing associated with the roll and provided with a passage for conducting adhesive to the periphery of said roll, a heated casing provided with a chamber for receiving and melting the leading end of a solid rod of adhesive and having an inlet and an outlet, a rotatable member, cooperating with said chamber to form a passageway within the casing extending from said inlet to said outlet, for melting the solid rod and for feeding adhesive along said passageway from the inlet to the outlet of said heated casing, means for connecting the outlet of said casing with the passage in said housing, and means for rotating said rotatable member at a speed different from the speed of rotation of said applying roll.

8. In a machine for applying heated thermoplastic adhesive to work pieces, a driven applying roll, a housing associated with the roll and provided with a passage for conducting adhesive to the periphery of said roll, a heated casing provided with a chamber for receiving and melting the leading end of a solid rod of adhesive and having an inlet and an outlet, a rotatable disk, cooperating with said chamber to form a passageway within the casing extending from said inlet to said outlet, for melting the solid rod and for feeding adhesive along said passageway from the inlet to the outlet of said heated casing, means for connecting the outlet of said casing with the passage in said housing, a pump for delivering molten adhesive from the outlet of said casing to the passage in said housing, and means for rotating said disk at a speed different from the speed of rotation of said applying roll.

9. In a machine for applying heated thermoplastic adhesive to work pieces, a driven applying roll, a housing associated with the roll and provided with a passage for conducting adhesive to the periphery of said roll, a heated casing provided with a chamber for receiving and melting the leading end of a solid rod of adhesive and having an inlet and an outlet, a rotatable member, cooperating with said chamber to form a passageway within the casing extending from said inlet to said outlet, for melting the solid rod and for feeding adhesive along said passageway from the inlet to the outlet of said heated casing, means for connecting the outlet of said casing with the passage in said housing, a pump for delivering molten adhesive from the outlet of said casing to the passage in said housing, means for controlling the output of said pump to vary the quantity of molten adhesive conducted to the periphery of the applying roll, and means for rotating said rotatable member at a speed different from the speed of rotation of said applying roll.

10. In a machine for applying heated thermoplastic adhesive to work pieces, a driven applying roll, a housing associated with the roll and provided with a passage for conducting adhesive to the periphery of said roll, an adjustable doctor blade carried by said housing and cooperating with the periphery of the applying roll, a heated casing provided with a chamber for receiving and melting the leading end of a solid rod of adhesive and having an inlet and an outlet, a rotatable disk, cooperating with said chamber to form a passageway within the casing extending from said inlet to said outlet, for melting the solid rod and for feeding adhesive along said passageway from the inlet to the outlet of said heated casing, means for connecting the outlet of said casing with the passage in said housing, a pump for delivering molten adhesive from the outlet of said casing to the passage in said housing, means for controlling the output of said pump to vary the quantity of molten adhesive conducted to the periphery of the applying roll, and means for rotating said disk at a speed different from the speed of rotation of said applying roll.

References Cited in the file of this patent

UNITED STATES PATENTS

| | | |
|---|---|---|
| 572,373 | Richards | Dec. 1, 1896 |
| 962,619 | Buffelen | June 28, 1910 |
| 1,258,322 | Doellinger | Mar. 5, 1918 |
| 1,412,471 | La Bombard et al. | Apr. 11, 1922 |
| 1,899,941 | Card | Mar. 7, 1933 |
| 2,469,392 | Jones et al. | May 10, 1949 |
| 2,700,260 | Paulsen | Jan. 25, 1955 |
| 2,726,629 | Paulsen | Dec. 13, 1955 |
| 2,765,768 | Paulsen | Oct. 9, 1956 |